United States Patent
Choi et al.

(10) Patent No.: US 8,014,092 B2
(45) Date of Patent: Sep. 6, 2011

(54) METHOD OF DETECTING BAD SERVO TRACK IN HARD DISK DRIVE

(75) Inventors: Ho-Joon Choi, Suwon-si (KR); Chung-Nae Cho, Suwon-si (KR); Seung-Taek Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 232 days.

(21) Appl. No.: 12/362,688

(22) Filed: Jan. 30, 2009

(65) Prior Publication Data

US 2009/0196137 A1 Aug. 6, 2009

(30) Foreign Application Priority Data

Jan. 31, 2008 (KR) ............... 10-2008-0010236

(51) Int. Cl.
*G11B 27/36* (2006.01)
(52) U.S. Cl. ......................................... 360/31
(58) Field of Classification Search ............... None
See application file for complete search history.

(56) References Cited

U.S. PATENT DOCUMENTS

| | | | | |
|---|---|---|---|---|
| 5,798,883 A | * | 8/1998 | Kim ........................ | 360/31 |
| 6,906,883 B2 | * | 6/2005 | Chu et al. ................ | 360/75 |
| 6,950,265 B2 | * | 9/2005 | Hetzler et al. .......... | 360/75 |
| 7,274,639 B1 | * | 9/2007 | Codilian et al. ........ | 369/53.17 |
| 7,423,825 B2 | * | 9/2008 | Shimamura et al. .... | 360/31 |

FOREIGN PATENT DOCUMENTS

| | | |
|---|---|---|
| JP | 10-027444 | 1/1998 |
| JP | 10-105901 | 4/1998 |
| JP | 2004-005850 | 1/2004 |
| JP | 2006-172590 | 6/2006 |
| KR | 1020030091484 | 12/2003 |

\* cited by examiner

*Primary Examiner* — K. Wong
(74) *Attorney, Agent, or Firm* — Stanzione & Kim, LLP (57) ABSTRACT

A method of detecting a bad servo track of an HDD includes measuring servo AGC of each of servo sectors of a servo track requiring determination of badness, calculating statistic data with respect to the measured servo AGC of each servo sector, and determining whether the servo track is bad based on the calculated statistic data. Since the badness of a servo track is determined based on the statistic data of the servo AGC, a bad servo track generated due to a change in the overall magnitude of a servo signal is easily detected so that reliability in the detection of a detective servo track can be improved.

16 Claims, 10 Drawing Sheets

METHOD OF DETECTING BAD SERVO TRACK IN HARD DISK DRIVE

CROSS-REFERENCE TO RELATED APPLICATIONS

This application claims priority under 35 U.S.C. §119 to Korean Patent Application No. 10-2008-0010236, filed on Jan. 31, 2008 in the Korean Intellectual Property Office, the disclosure of which is incorporated herein by reference in its entirety.

BACKGROUND OF THE INVENTION

1. Field of the Invention

The present general inventive concept relates to a method of detecting a bad servo track in a hard disk drive (HDD), and more particularly, to a method of detecting a bad servo track in the HDD by using a servo auto gain control (AGC).

2. Description of the Related Art

Hard disk drives (HDDs) are devices to record data on a disk or reproduce data stored on the disk by using a read/write head. The HDDs are widely used as auxiliary memory devices of computer systems because of their fast access time to a large amount of data.

As the HDD having a high TPI (tracks per inch) and a high BPI (bits per inch) can be embodied, an increase in the data storage capacity and a decrease in the size have been rapidly realized. Also, the application of the HDD has been expanded to laptops, MP3 players, and mobile communication terminals.

The operation of normally reading or writing data with respect to the HDD is initiated by searching for a precise position by reading a servo pattern recorded on a servo track of a disk. The process of recording a servo pattern on a service track is referred to as a servo track write (STW). One of the servo track write process is a method of recording a servo pattern in two steps. According to the method, a reference servo pattern is recorded on a servo track using a servo writer. A final servo pattern is recorded by referring to the reference servo pattern. The reference servo pattern is recorded in units of several tracks, for example, and the final servo pattern is recorded in detail on each track while servo control is performed according to the reference servo pattern. In general, the reference servo pattern is recorded ink a clean room while the final servo pattern is recorded outside the clean room.

A defect in the servo track write generated in the HDD manufacturing process and a defect due to a bad disk (hereinafter, referred to as the "bad servo track") unavoidably exists in the servo track. Since the bad servo track generates an error in the process of reading and writing data with respect to the disk, the bad servo track needs to be found for the stable use of the HDD. However, since a process time required to find the bad servo track increases as a track density increases, a method of more efficiently finding a bad servo track is needed.

In a conventional technology, a method of checking a signal of a particular portion of a servo sector, such as, a gray code, a burst signal, or a position error signal (PES) to detect a bad servo track has been used. The conventional detection method is useful to detect a bad servo track due to the miswriting of a burst signal, or a broken gray code.

Meanwhile, an error may be generated in the process of reading and writing data with respect to a disk even when the magnitude of a servo signal changes in the same servo track. Thus, a servo track in which a change in the magnitude of a servo signal deviates from a predetermined scope needs to be detected as a bad servo track. However, in the conventional detection method for checking a signal of a particular portion of a servo sector, it is difficult to detect a bad servo track due to the change in the magnitude of a servo signal.

SUMMARY OF THE INVENTION

The present general inventive concept provides a method of detecting a bad servo track of an HDD which easily detects a bad servo track due to a change in the magnitude of a servo signal so that reliability in the detection of a bad servo track can be improved.

Additional and/or other aspects and utilities of the present general inventive concept will be set forth in part in the description which follows and, in part, will be obvious from the description, or may be learned by practice of the general inventive concept.

Embodiments of the present general inventive concept provide a method of detecting a bad servo track of an HDD which includes measuring servo AGC of each of servo sectors of a servo track requiring determination of badness, calculating statistic data with respect to the measured servo AGC of each servo sector, and determining whether the servo track is bad based on the calculated statistic data.

In the calculating of statistic data, an average is calculated with respect to the measured servo AGC of each servo sector and, in the determining whether the servo track is bad, the calculated average is compared with the servo AGC of each servo sector and, when the number of servo sectors in which the difference the servo AGC and the calculated average is over a preset first critical value is over a preset number, the servo track is determined to be bad.

The first critical value is set by a percentage rate of the calculated average. The preset number is set according to the required quality of the HDD. The preset number is six or more.

In the calculating of statistic data, a variance is calculated with respect to the measured servo AGC of each servo sector and, in the determining whether the servo track is bad, the calculated variance is compared with a preset second critical value and, when the calculated variance is over the second critical value, the servo track is determined to be bad.

The method is performed to a servo track in which a reference servo pattern is recorded and a final servo pattern is not recorded.

The method is performed to a servo track in which a final servo pattern is recorded.

In the measuring of servo AGC, the measured servo AGC is stored in a memory or a predetermined storage space of a disk.

The method may further include mapping a servo track determined to be bad to a defect table so that the servo track determined to be bad is no longer used to record and reproduce data.

In the calculating of statistic data, an average and a variance are calculated to the measured servo AGC of each servo sector, and the determining whether the servo track is bad includes comparing the calculated average with the servo AGC of each servo sector and determining whether the number of servo sectors in which the difference the servo AGC and the calculated average is over a preset first critical value is over a preset number, and comparing the calculated variance with a preset second critical value and determining whether the calculated variance is over the preset second critical value.

The determining whether a servo track is bad further includes determining the servo track to be bad when the number of servo sectors is over the first critical value or the calculated variance is over the second critical value.

The determining whether a servo track is bad further includes determining the servo track to be bad when the number of servo sectors is over the first critical value and the calculated variance is over the second critical value.

BRIEF DESCRIPTION OF THE DRAWINGS

The above and/or other features and utilities of the present general inventive concept will become apparent and more readily appreciated from the following detailed description, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
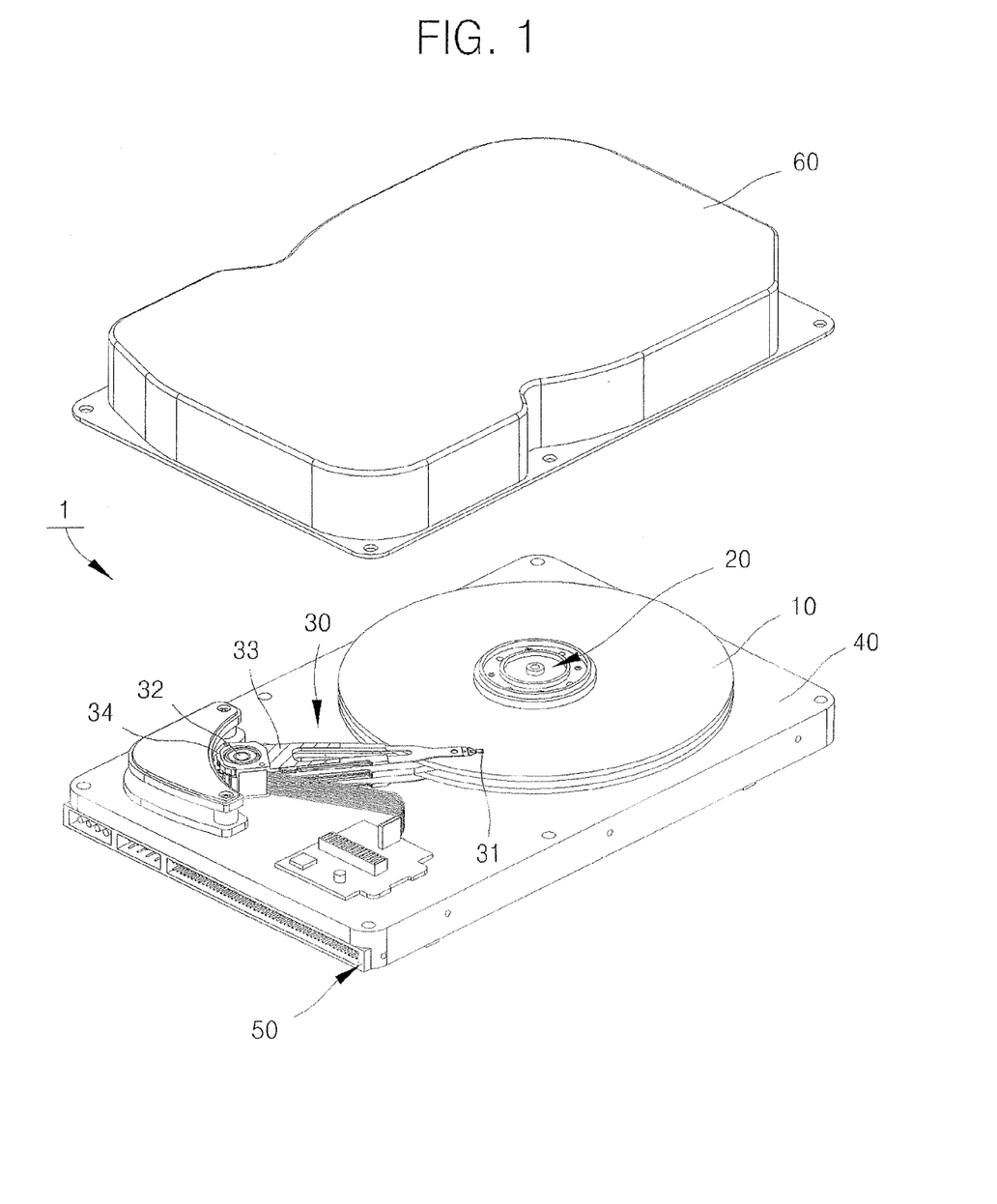
FIG. 1 is a partially exploded perspective view of an HDD according to an embodiment of the present general inventive concept.

FIG. 1 is a partially exploded perspective view of an HDD 1 according to an embodiment of the present general inventive concept. Referring to FIG. 1, the HDD 1 according to the present embodiment includes a disk 10 to record and store data, a spindle motor 20 to support and rotate the disk 10, a head stack assembly (HSA) 30 to record data on the disk 10 and/or read data from the disk 10, a base 40 where these elements are assembled, a printed circuit board assembly (PCBA) 50 coupled to a lower portion of the base 40, having a printed circuit board (PCB) on which most circuit parts are installed, and controlling various elements, and a cover 60 to cover an upper portion of the base 40.

The HSA 30 that is a carrier to record data on the disk 10 or reproduce the data from the disk 10, includes a head 31 to write data to the disk 10 or read the recorded data, an actuator arm 33 that pivots across the disk 10 around a pivot shaft 32 as a shaft center to allow the head 31 to access the data on the disk 10, a pivot shaft holder 34 that rotatably supports the pivot shaft 32 and to which the actuator arm 33 is coupled, and a bobbin (not shown) provided at the opposite side of the actuator arm 33 with respect to the pivot shaft holder 34 and having a voice coil wound around the bobbin to be disposed between a voice coil motor (VCM, not shown) and a magnet (not shown).

Figure 2:
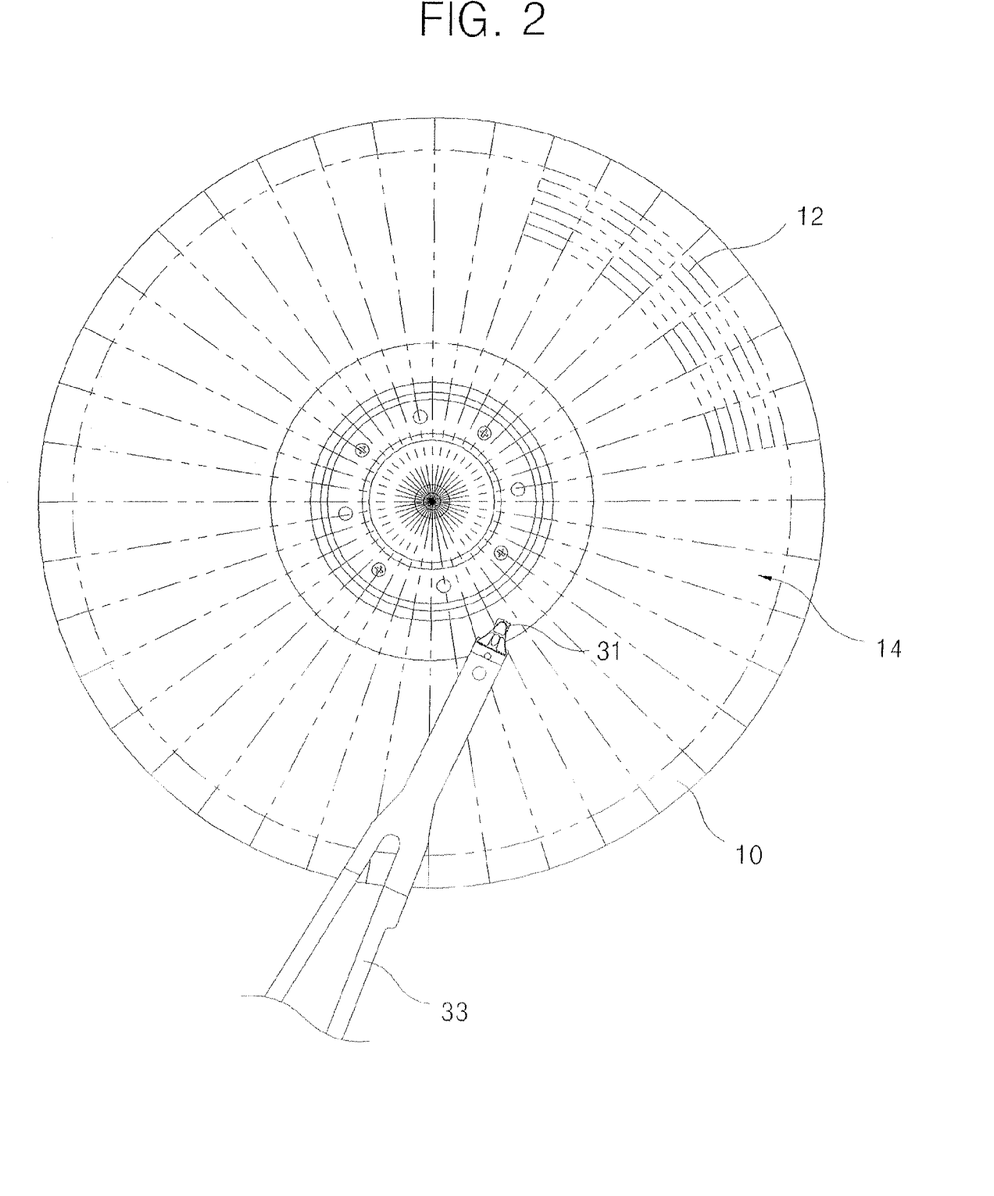
FIG. 2 is a plan view of a disk area of the HDD of FIG. 1.
Figure 3:
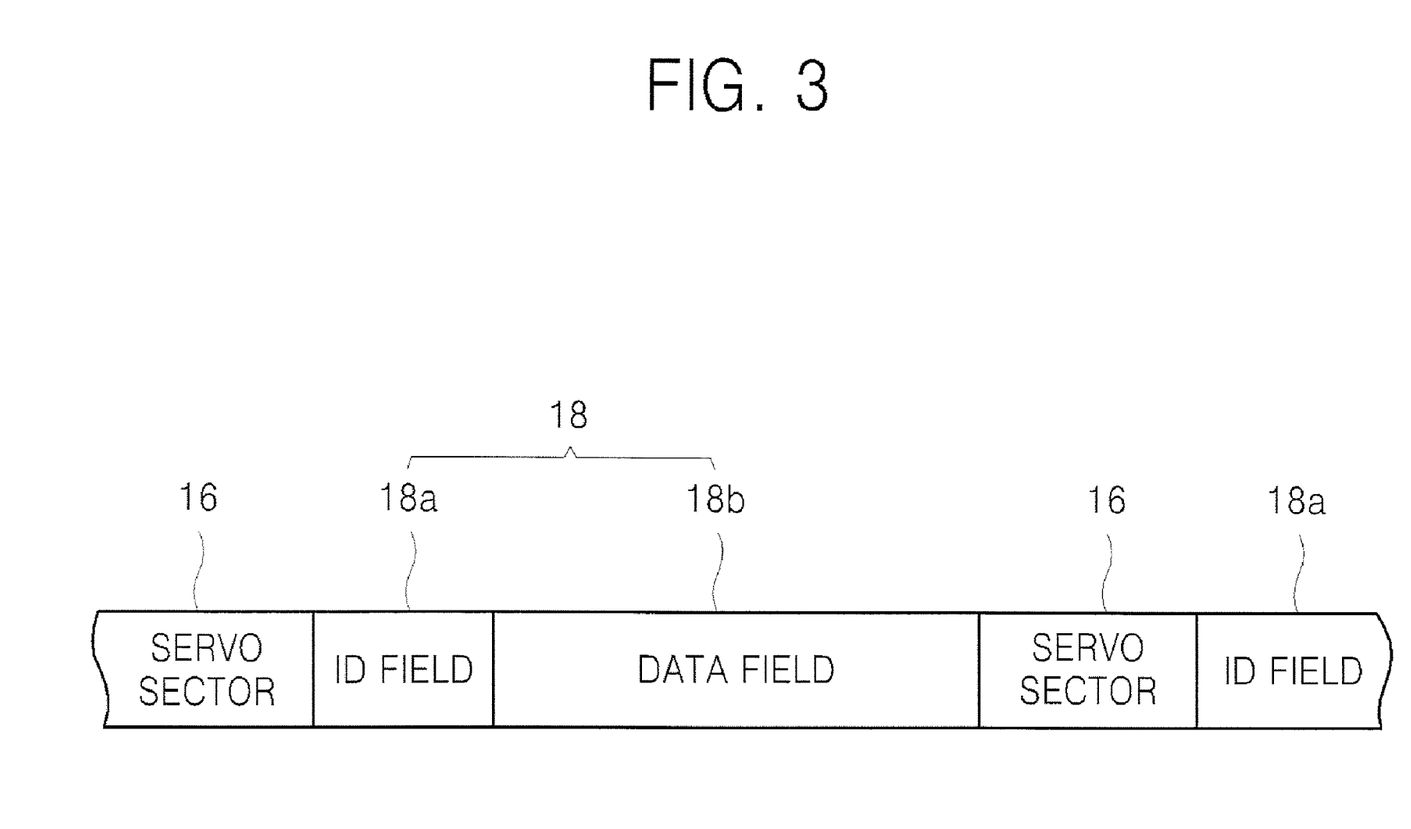
FIG. 3 illustrates a data format of a certain track in the HDD of FIG. 1.
Figure 4:
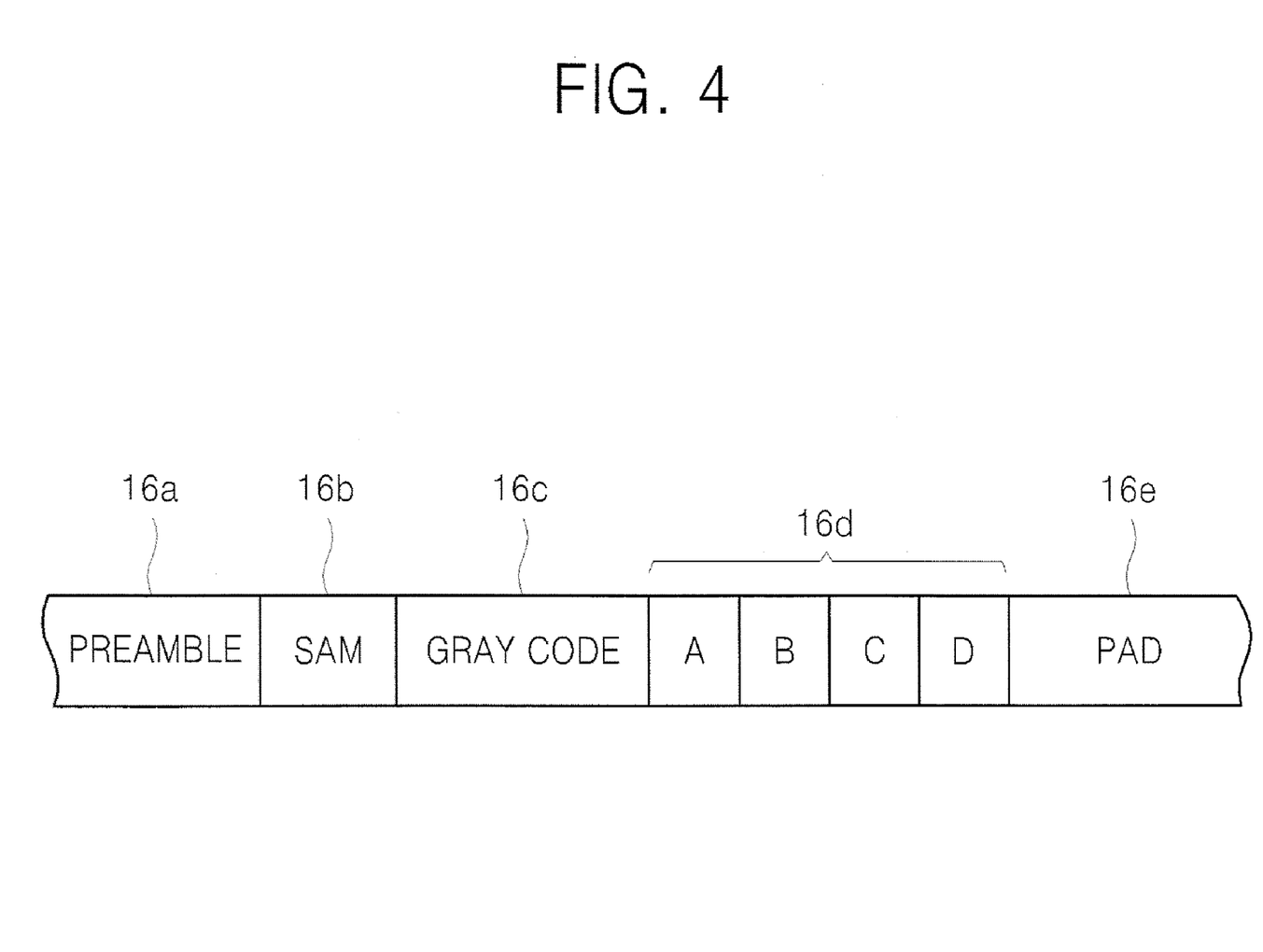
FIG. 4 illustrates a detailed configuration of a servo sector of FIG. 3.

FIG. 2 is a plan view of a disk area of the HDD of FIG. 1. FIG. 3 illustrates a data format of a certain track in the HDD of FIG. 1. FIG. 4 illustrates a detailed configuration of a servo sector of FIG. 3.

Referring to FIG. 2, the disk 10 to record and store data includes a track 12 as an object to store servo information and data information and a sector 14 as a unit object obtained by dividing the track 12 at an identical angle with respect to the center of rotation. In the track 12, as shown in FIG. 3, a servo sector 16 to provide servo control, such as, track seeking and track following, and a data sector 18 to reduce user data are alternately arranged. The servo sector 16, as shown in more detail in FIG. 4, includes a preamble 16a, a servo address mark (SAM) 16b, a gray code 16c, bursts A, B, C, and D of 16d, and a PAD 16e.

The preamble 16a indicates being a servo sector by simultaneously providing clock sync and a gap in front of the servo sector, during detection of servo information, and is referred to as servo sync. The SAM 16b provides sync to read the gray code 16c that follows, by indicating a start of servo. That is, the SAM 16b is provided as a reference point to generate a variety of timing pulses related to the servo control. The gray code 16c provides information about each of the tracks 12, that is, track information. The bursts A, B, C; and D of 16d provide a position error signal (PES) that is needed for the track seeking and track following. The bursts A, B, C, and D of 16d are mostly recorded directly by using a write head of the HDD 1. The PAD 16e provides a transition margin from the servo sector 16 to the data sector 18.

The data sector 18 is positioned before and after the servo sector 16 and includes an identification field (ID field) 18a and a data filed 18b. In the ID field 18a, header information to identify the data sector 18 is recorded. In the data field 18b, digital data that a user desires to record is recorded.

Figure 5:
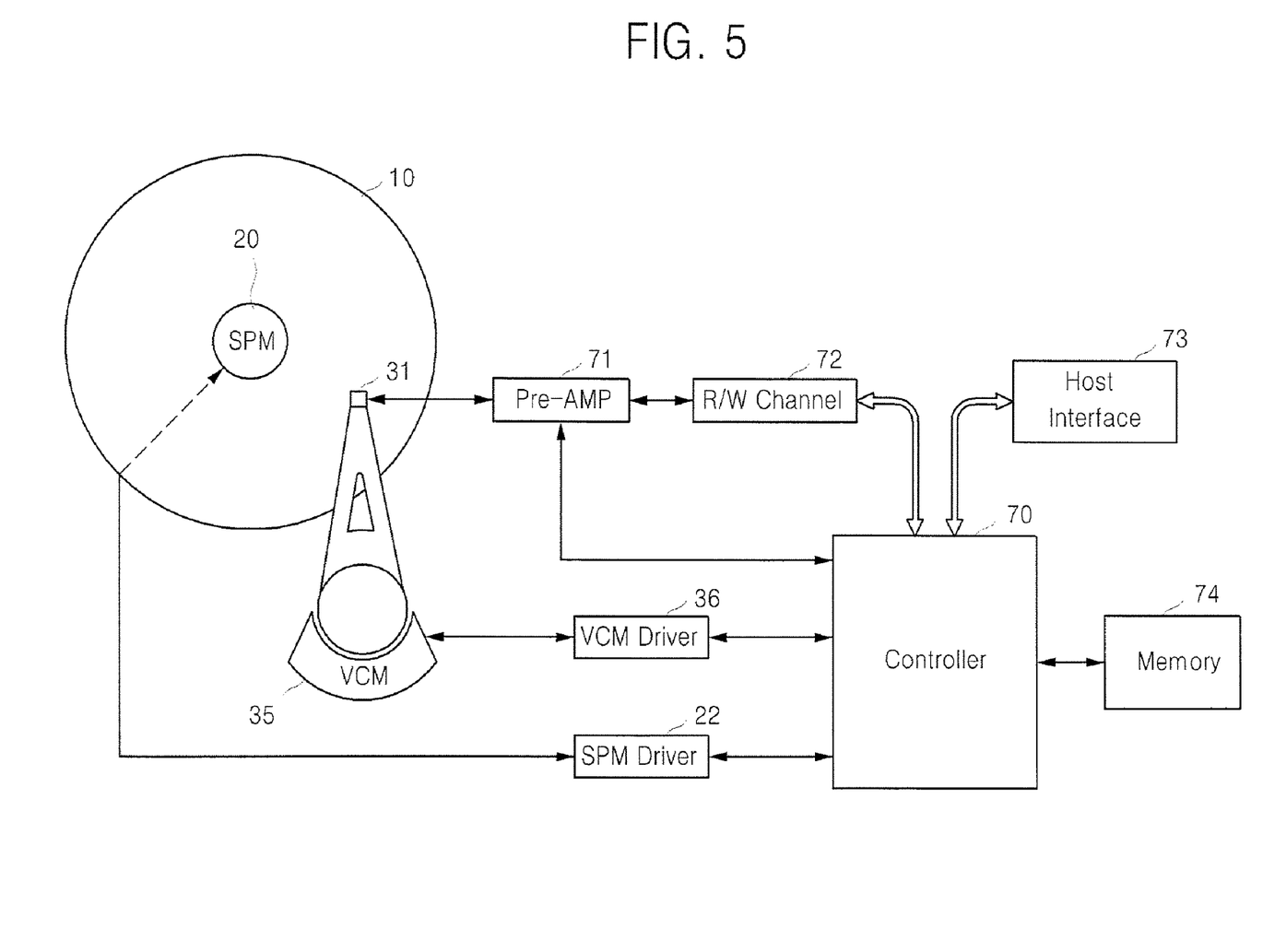
FIG. 5 is a block diagram of a drive circuit of the HDD employing a method of detecting a bad servo track according to an embodiment of the present general inventive concept.

FIG. 5 is a block diagram of a drive circuit of the HDD 1 employing a method of detecting a bad servo track according to an embodiment of the present general inventive concept. Referring to FIG. 5, the HDD 1 includes the head 31 to record data on the disk 10 or reproduce the recorded data, the disk 10 to record data thereon by using the head 31, a spindle motor (SPM) driver 22 to provide drive current to the spindle motor 20 to control the rotation of the disk 10 by driving the spindle motor 20, a VCM driver 36 to provide drive current to a voice coil (not shown) to control the movement of the head 31 by driving the VCM, a controller 70 connected to the head 31 via a read/write (R/W) channel 72 and a preamplifier (Pre-AMP) 71, and a memory 74 to store commands and data used by the controller 70 to execute software routine.

Information is typically transmitted to a host interface 73 through the R/W channel 72. The host interface 73 includes a control circuit to interface with a system such as a personal computer.

The R/W channel 72, in a read mode, converts an analog signal read by the head 31 and amplified by the Pre-AMP 71 to a digital signal that can be read by a host computer (not shown) and outputs the converted signal to the host interface 73. Also, in a write mode, the R/W channel 72 converts the user data received via the host interface 73 and outputs a write signal to the Pre-AMP 71. Then, the Pre-AMP 71 converts the write signal to a write current and outputs the converted current through the head 31.

The controller 70 may be a digital signal processor (DIP), a microprocessor, or a microcontroller, or may be embodied by software or firmware. The controller 70 provides a control signal to the R/W channel 72 to read data from the disk 10 or record data on the disk 10.

Figure 6:
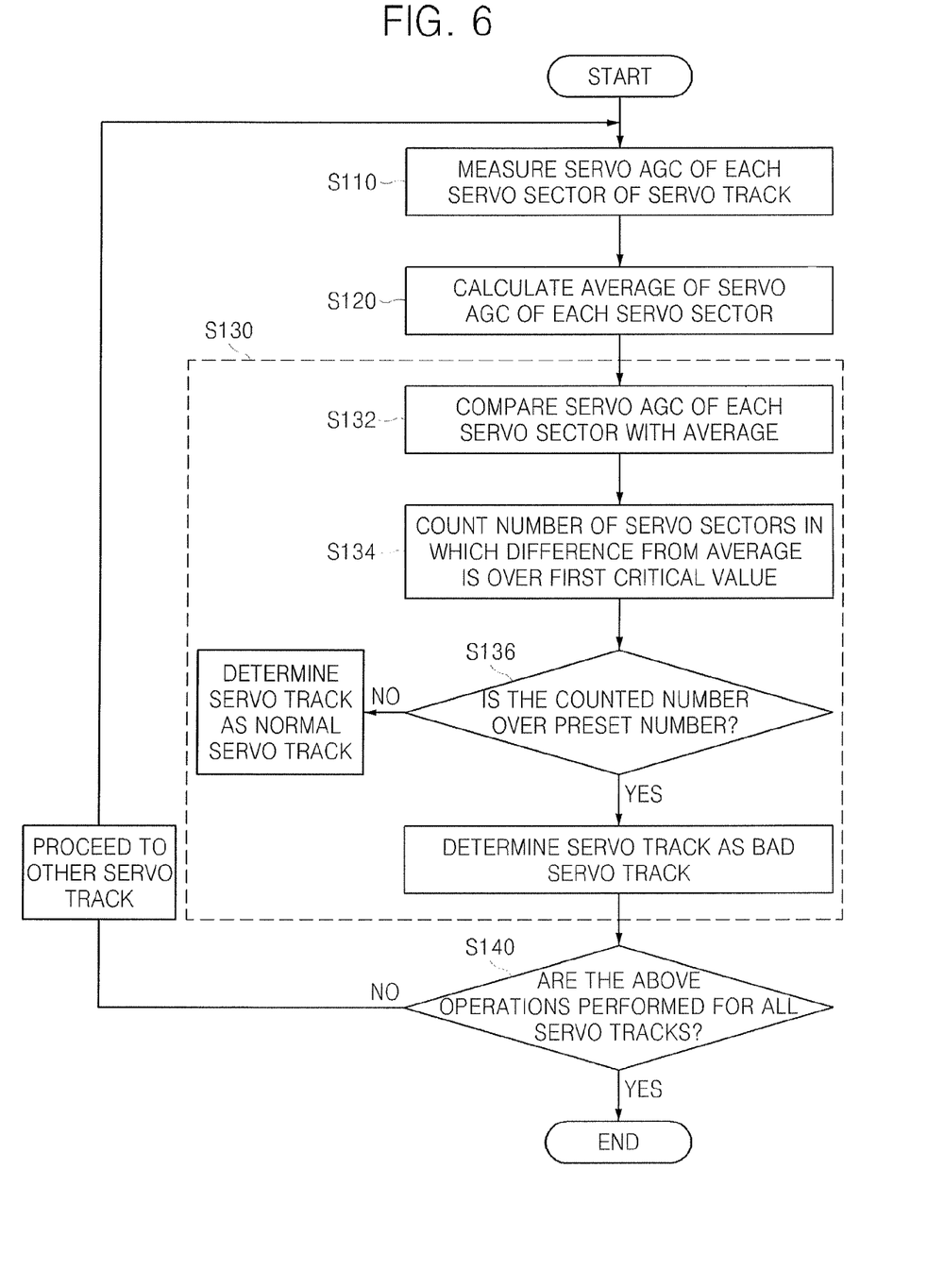
FIG. 6 is a flowchart explaining a method of detecting a bad servo track according to an embodiment of the present general inventive concept.

FIG. 6 is a flowchart explaining a method of detecting a bad servo track according to an embodiment of the present general inventive concept. Referring to FIG. 6, the method of detecting a bad servo track according to the present embodiment is described below.

At first, the operation of measuring servo auto gain control (servo AGC) of each servo sector of a servo track requiring determination of badness is performed (operation S110). In this operation, the measured servo AGC is stored in the memory 74 or in a predetermined storage space in the disk 10.

The servo AGC is to automatically optimize gain by using the preamble of a servo sector to finally create a signal having a particular magnitude. When the magnitude of the servo signal is small, the servo AGC has a large value. When the magnitude of the servo signal is large, the servo AGC has a small value. That is, the change in the overall magnitude of the servo signal is indicated by a change of the servo AGC.

The operation of calculating an average as a statistic data with respect to the measured servo AGC of each servo sector is performed (operation S120).

Next, the operation of determining whether a servo track is bad based on the calculated average is performed (operation S130). The operation S130 includes comparing the calculated average with the servo AGC of each servo sector (operation S132), counting the number of servo sectors in which the difference the servo AGC and the calculated average is over a preset first critical value (operation S134), and classifying the servo sectors into a bad servo track and a normal servo track according to the number of the counted servo sectors (operation S136).

In the classifying of servo sectors into a bad servo track and a normal servo track (operation S136), if the number of the counted servo sectors is over a preset number, the servo track is determined as a bad servo track. Otherwise, the servo track is determined as a normal servo track. The first critical value is a reference value in the determination of a bad servo track and is set by a percentage rate of the calculated average. The preset number is set according to the required quality of an HDD. That is, the preset number is low when the quality of the HDD is high, whereas the preset number is high when the quality of the HDD is low. However, according to a result obtained from a test, the preset number is 6 or more.

Next, the operation of determining whether the above-described operations S110, S120, and S130 are performed for all servo tracks requiring the determination of badness is performed (operation S140). If the above operations S110, S120, and S130 are performed for all servo tracks, the method of detecting a bad servo track according to the present embodiment is completed. Otherwise, the above operations S110, S120, and S130 are sequentially performed for the remaining servo tracks.

Although not illustrated in FIG. 6, the method of detecting a bad servo track according to the present embodiment further includes mapping the servo track determined to be bad to a defect table so that the servo tracks determined to be bad in the operation S130 are no longer used to record and reproduce data.

Figure 7:
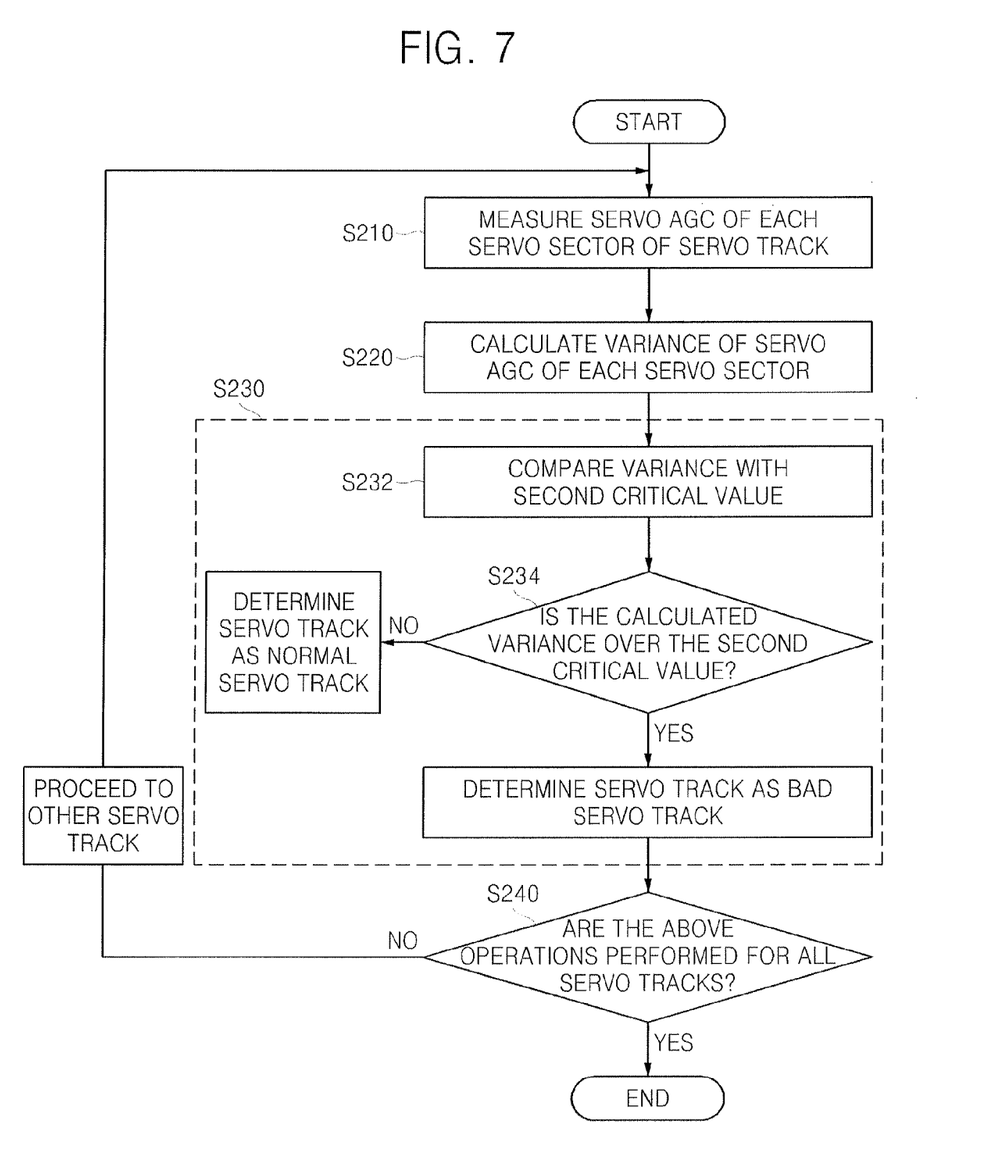
FIG. 7 is a flowchart explaining a method of detecting a bad servo track according to another embodiment of the present general inventive concept.

FIG. 7 is a flowchart explaining a method of detecting a bad servo track according to another embodiment of the present general inventive concept. Referring to FIG. 7, the method of detecting a bad servo track according to the present embodiment is mainly described below regarding differences from the above-described embodiment of FIG. 6.

At first, the operation of measuring servo AGC to each servo sector of a servo track requiring the determination of badness is performed (operation S210). In this operation, the measured servo AGC is stored in the memory 74 or in a predetermined storage space in the disk 10.

The operation of calculating a variance as a statistic data with respect to the measured servo AGC of each servo sector is performed (operation S220). The variance statistically signifies a difference between a value of each variable and an average of the variables. That is, when an average of a variable X is E(X), the variance signifies an average of {X−E(X)}2. When the variance is zero (Variance=0), it signifies that all data are concentrated at the average so that there is no dispersion.

Next, the operation of determining whether a servo track is bad based on the calculated variance is performed (operation S230). The operation S230 includes comparing the calculated variance with a preset second critical value (operation S232) and classifying the servo sectors into a bad servo track and a normal servo track according to a result of the comparison (operation S234).

In the classifying of servo sectors into a bad servo track and a normal servo track (operation S234), if the calculated variance is over the preset second critical value, the servo track is determined as a bad servo track. Otherwise, the servo track is determined as a normal servo track. The second critical value is a reference value in the determination of a bad servo track and is set according to the required quality of an HDD. That is, the second critical value is low when the quality of the HDD is high, whereas the second critical value is high when the quality of the HDD is low.

Next, the operation of determining whether the above-described operations S210, S220, and S230 are performed for all servo tracks that require the determination of badness is performed (operation S240). If the above operations S210, S220, and S230 are performed for all servo tracks, the method of detecting a bad servo track according to the present embodiment is completed. Otherwise, the above operations S210, S220, and S230 are sequentially performed for the remaining servo tracks.

A method of detecting a bad servo track according to another embodiment will be described below. In the embodiments shown in FIGS. 6 and 7, the average and the variance of the AGC of a servo sector are respectively used as the statistic data to determine the badness of a servo track. In the present embodiment, however, the average and the variance of the AGC of a servo sector are used together as the statistic data.

The method of detecting a bad servo track according to the present embodiment includes measuring servo AGC to each servo sector in a servo track requiring the determination of badness, calculating an average and variance to the measured servo AGC of each servo sector, and determining the badness of the servo track based on the calculated average and variance.

The determining of the badness of a servo track includes comparing the calculated average with the servo AGC of each servo sector so as to determine whether the number of servo sectors in which the difference between the servo AGC and the calculated average is over a preset first critical value is over a preset number, and comparing the calculated variance with a preset second critical value so as to determine whether the calculated variance is over the preset second critical value. In this operation of determining the badness of a servo track, if the number of servo tracks over the first critical value is over the preset number, or if the calculated variance is over the second critical value, the servo track is determined to be bad.

As described above, according to the method of detecting a bad servo track according to the present embodiment, since the badness of a servo track is determined using a more strict standard as compared to the above-described previous embodiments, reliability in the detection of a bad servo track can be further improved.

Meanwhile, in view of efficiency, it is preferable that, for an HDD having a relatively loose standard to a bad servo track, a servo track is determined to be bad when the number of servo tracks over the first critical value is over the preset number, and the calculated variance is over the second critical value.

Figure 8:
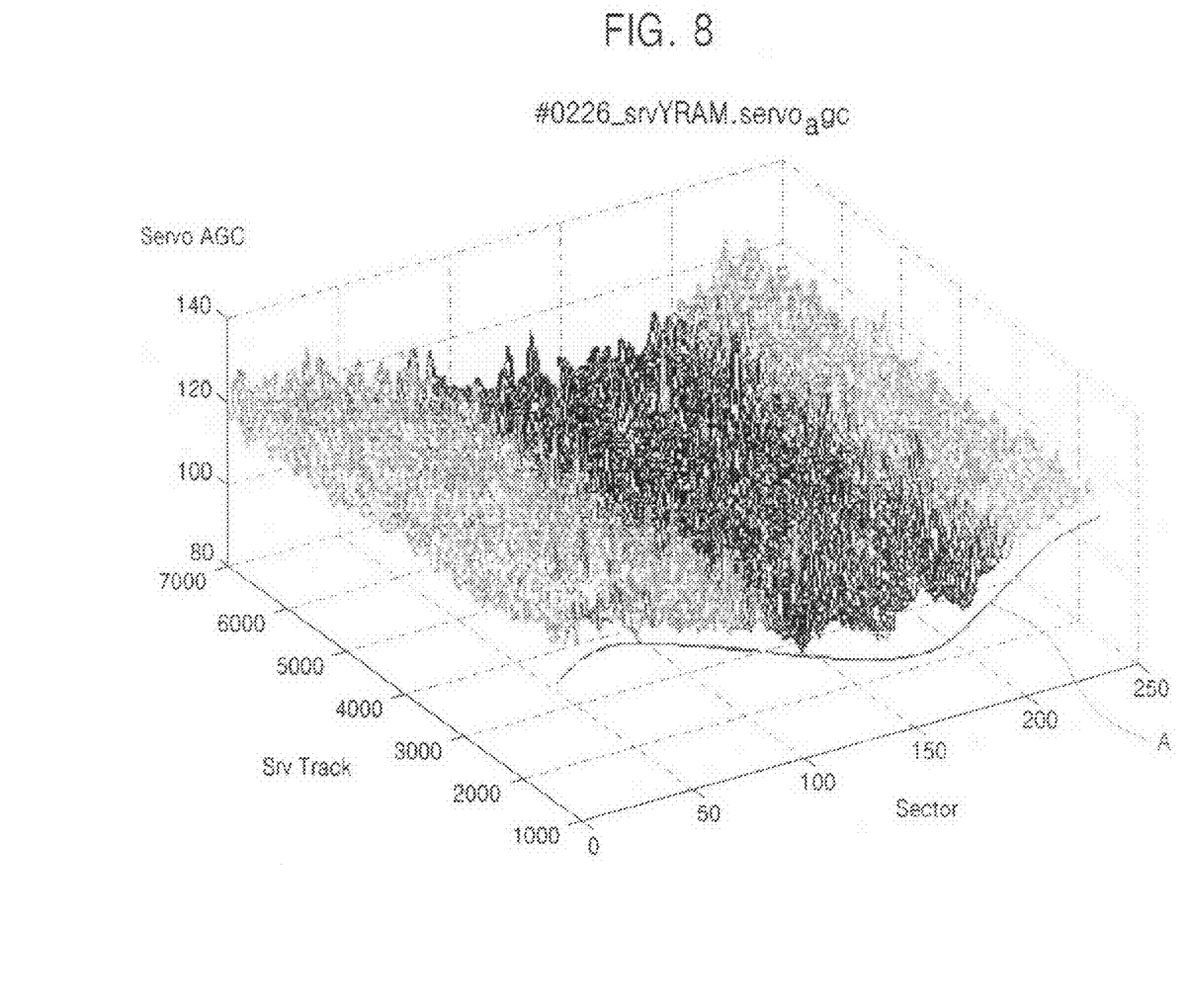
FIGS. 8-10 are graphs showing the result of the detection of a bad servo track in the HDD generated due to an error in the servo AGC during a process by applying a method of detecting a bad servo track according to an embodiment of the present general inventive concept.
Figure 9:
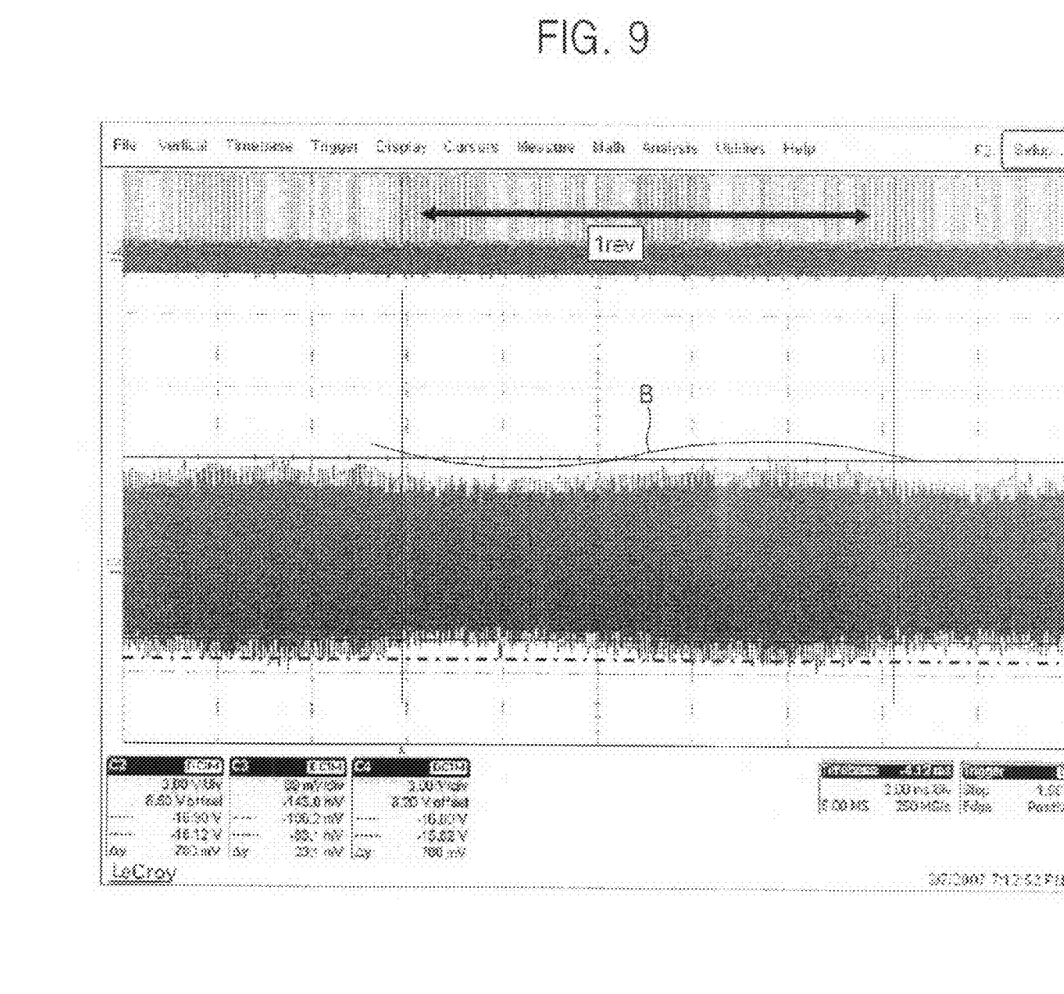
Figure 10:
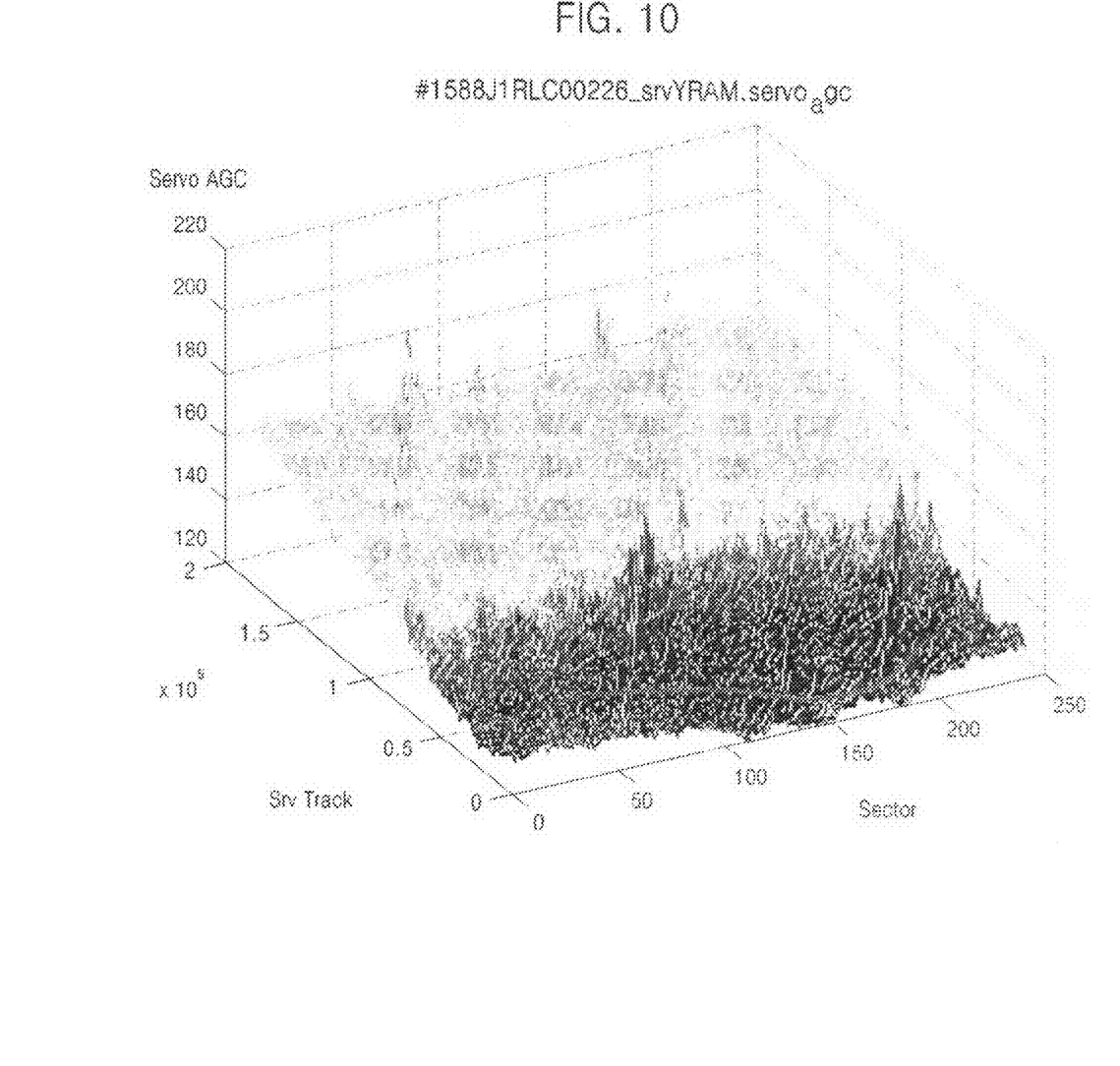

FIGS. 8-10 are graphs showing the result of the detection of a bad servo track in the HDD generated due to an error in the servo AGC during a process by employing a method of detecting a bad servo track according to an embodiment of the present general inventive concept. In detail, FIG. 8 indicates servo AGC information measured in the HDD having a bad servo track. FIG. 9 indicates a servo signal of a bad servo track. The servo AGC information is measured from a servo track in which a reference servo pattern is recorded and a final servo pattern is not recorded.

Referring to a curve A of FIG. 8 and a curve B of FIG. 9, it can be seen that a change in the overall magnitude of a servo signal in the same servo track is indicated by a change in the servo AGC. As described above, when the magnitude of the servo signal is small, the servo AGC has a large value, and when the magnitude of the servo signal is large, the servo AGC has a small value. The curve B of FIG. 9 indicates the magnitude of a servo signal in the same servo track.

In the present method, the badness of a servo track is determined based on the statistic data of the servo AGC, according to the relationship between the change in the servo AGC and the change in the overall magnitude of the servo signal, so that a bad servo track due to a change in the overall magnitude of a servo signal can be easily detected.

Accordingly, the present method can improve reliability in the detection of a bad servo track, compared to a conventional detection method (that is the detection method to check a signal of a particular portion of a servo sector, such as, a gray code, a burst signal, or a position error signal), which has a problem in detecting a bad servo track due to a change in the overall magnitude of a servo signal.

FIG. 10 is a graph showing the servo AGC information measured in the overall area of the same HDD as that of FIG. 8. It can be seen that the shape of the servo AGC information is the same as that of FIG. 8. The servo AGC is measured from a servo track where a final servo pattern is recorded.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Thus, it is preferable in view of efficiency that the embodiments of the present general inventive concept are performed to a servo track in which a reference servo pattern is recorded, but a final servo pattern is not recorded. However, for a higher reliability, the embodiments may be performed with respect to a servo track in which the final servo pattern is recorded.

As described above, according to the exemplary embodiments of the present general inventive concept, since the badness of a servo track is determined based on the statistic data of the servo AGC, a bad servo track generated due to a change in the overall magnitude of a servo signal is easily detected so that reliability in the detection of a detective servo track can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of detecting a bad servo track of an HDD, the method comprising:
   measuring servo AGC of each of servo sectors of a servo track requiring determination of badness;
   calculating statistic data with respect to the measured servo AGC of each servo sector; and
   determining whether the servo track is bad based on the calculated statistic data.

2. The method of claim 1, wherein, in the calculating of statistic data, an average is calculated with respect to the measured servo AGC of each servo sector; and
   in the determining whether the servo track is bad, the calculated average is compared with the servo AGC of each servo sector and, when the number of servo sectors in which the difference the servo AGC and the calculated average is over a preset first critical value is over a preset number, the servo track is determined to be bad.

3. The method of claim 2, wherein the first critical value is set by a percentage rate of the calculated average.

4. The method of claim 2, wherein the preset number is set according to the required quality of the HDD.

5. The method of claim 4, wherein the preset number is six or more.

6. The method of claim 1, wherein, in the calculating of statistic data, a variance is calculated with respect to the measured servo AGC of each servo sector; and
   in the determining whether the servo track is bad, the calculated variance is compared with a preset second critical value and, when the calculated variance is over the second critical value, the servo track is determined to be bad.

7. The method of claim 1, being performed to a servo track in which a reference servo pattern is recorded and a final servo pattern is not recorded.

8. The method of claim 1, being performed to a servo track in which a final servo pattern is recorded.

9. The method of claim 1, wherein, in the measuring of servo AGC, the measured servo AGC is stored in a memory or a predetermined storage space of a disk.

10. The method of claim 1, further comprising:
    mapping a servo track determined to be bad to a defect table so that the servo track determined to be bad is no longer used to record and reproduce data.

11. The method of claim 1, wherein, in the calculating of statistic data, an average and a variance are calculated to the measured servo AGC of each servo sector; and the determining whether the servo track is bad comprises:

comparing the calculated average with the servo AGC of each servo sector so as to determine whether the number of servo sectors in which the difference the servo AGC and the calculated average is over a preset first critical value is over a preset number; and comparing the calculated variance with a preset second critical value to determine whether the calculated variance is over the preset second critical value.

12. The method of claim 11, wherein the determining whether the servo track is bad further comprises:

determining the servo track to be bad when the number of servo sectors is over the first critical value or the calculated variance is over the second critical value.

13. The method of claim 11, wherein the determining whether the servo track is bad further comprises:

determining the servo track to be bad when the number of servo sectors is over the first critical value and the calculated variance is over the second critical value.

14. A non-transitory computer readable recording medium containing a method of detecting a bad servo track of an HDD, the method comprising:

measuring servo AGC of each of servo sectors of a servo track requiring determination of badness;

calculating statistic data with respect to the measured servo AGC of each servo sector; and determining whether the servo track is bad based on the calculated statistic data.

15. The method of claim 14, wherein, in the calculating of statistic data, an average is calculated with respect to the measured servo AGC of each servo sector; and in the determining whether the servo track is bad, the calculated average is compared with the servo AGC of each servo sector and, when the number of servo sectors in which the difference the servo AGC and the calculated average is over a preset first critical value is over a preset number, the servo track is determined to be bad.

16. The method of claim 14, wherein, in the calculating of statistic data, a variance is calculated with respect to the measured servo AGC of each servo sector; and in the determining whether the servo track is bad, the calculated variance is compared with a preset second critical value and, when the calculated variance is over the second critical value, the servo track is determined to be bad.

* * * * *